(12) United States Patent
Leone

(10) Patent No.: US 12,277,000 B2
(45) Date of Patent: Apr. 15, 2025

(54) CONVEYOR-TYPE DEVICE

(71) Applicant: CAE HEALTHCARE CANADA INC., Saint-Laurent (CA)

(72) Inventor: Yvan Leone, Saint-Laurent (CA)

(73) Assignee: CAE HEALTHCARE CANADA INC., Saint-Laurent (CA)

( * ) Notice: Subject to any disclaimer, the term of this patent is extended or adjusted under 35 U.S.C. 154(b) by 203 days.

(21) Appl. No.: 18/187,835

(22) Filed: Mar. 22, 2023

(65) Prior Publication Data
US 2023/0305588 A1    Sep. 28, 2023

Related U.S. Application Data

(60) Provisional application No. 63/269,794, filed on Mar. 23, 2022.

(51) Int. Cl.
| | |
|---|---|
| G05G 5/03 | (2008.04) |
| B65G 15/14 | (2006.01) |
| B65G 17/38 | (2006.01) |
| B65G 21/12 | (2006.01) |
| B65G 21/14 | (2006.01) |
| G09B 23/28 | (2006.01) |

(52) U.S. Cl.
CPC ............... *G05G 5/03* (2013.01); *B65G 15/14* (2013.01); *B65G 21/12* (2013.01); *B65G 21/14* (2013.01); *B65G 17/38* (2013.01); *G05G 2505/00* (2013.01); *G09B 23/285* (2013.01)

(58) Field of Classification Search
CPC . G05G 5/03; G09B 23/28; G09B 9/00; B65G 21/209; B65G 15/14; B65G 21/12; B65G 2201/0217; B65G 17/38; B65G 21/14

USPC ...................................... 198/817, 626.5, 594
See application file for complete search history.

(56) References Cited

U.S. PATENT DOCUMENTS

| | | | |
|---|---|---|---|
| 3,559,905 A | 2/1971 | Palynchuk | |
| 3,915,291 A | 10/1975 | Vogts | |
| 5,094,340 A * | 3/1992 | Avakov | E21B 19/22 226/173 |
| 5,775,417 A | 7/1998 | Council | |
| 6,230,955 B1 | 5/2001 | Parks | |
| 7,222,722 B2 * | 5/2007 | Voigtlander | B65G 47/26 198/594 |

(Continued)

FOREIGN PATENT DOCUMENTS

| | | |
|---|---|---|
| CN | 211719142 U | 10/2020 |
| WO | WO-2019002048 A1 * | 1/2019 ............. B65G 17/42 |

*Primary Examiner* — James R Bidwell
(74) *Attorney, Agent, or Firm* — Fasken Martineau DuMoulin LLP; Johann Gest

(57) ABSTRACT

There is described a conveyor-type device comprising: a carriage slidably moveable along a conveyance path and defining a first channel therein; and two loops disposed on opposite sides of the path and rotatable in response to a movement of the carriage along the path to adjust the length of a second channel, the loops being configured to: rotatably engage with one another downstream from the carriage to extend the second channel as the carriage moves towards an end of the conveyance path; and rotatably disengage from one another upstream from the carriage to shorten the second channel as the carriage moves towards a beginning of the conveyance path, wherein the first channel and second channel are aligned for receiving an elongated body therein.

20 Claims, 6 Drawing Sheets

(56) References Cited

U.S. PATENT DOCUMENTS

| | | | |
|---|---|---|---|
| 7,766,158 B2* | 8/2010 | Laganiere | A01D 57/20 |
| | | | 198/312 |
| 8,783,447 B1* | 7/2014 | Yohe | B65G 15/14 |
| | | | 198/814 |
| 9,902,562 B2 | 2/2018 | Horschlager et al. | |
| 10,787,870 B1 | 9/2020 | Fulks et al. | |
| 2004/0076940 A1 | 4/2004 | Alexander et al. | |
| 2005/0217979 A1* | 10/2005 | Friessnegg | B65H 29/12 |
| | | | 198/626.5 |
| 2007/0137855 A1 | 6/2007 | Nielsen et al. | |
| 2009/0314612 A1* | 12/2009 | Krallinger | B27M 1/08 |
| | | | 198/626.5 |
| 2013/0233571 A1 | 9/2013 | Goddard | |
| 2017/0015504 A1 | 1/2017 | Horschlager et al. | |
| 2017/0260005 A1 | 9/2017 | Eichner et al. | |

* cited by examiner

CONVEYOR-TYPE DEVICE

CROSS-REFERENCE TO RELATED APPLICATION

The present application claims priority on U.S. Provisional Patent Application No. 63/269,794 filed on Mar. 23, 2022.

FIELD

The present technology is directed conveyor-type devices, and more particularly to conveyor-type devices comprising a length adjustable channel.

BACKGROUND

Some medical simulators are designed to simulate the insertion of an elongated instruments such as catheters or guidewires into a body. Some medical simulators are further provided with a mechanical device such as conveyor adapted to capture the distal end of the elongated instrument once inserted into the simulator to provide haptic feedback. The conveyor is usually movable within the medical simulator to capture the elongated instrument at different locations within the simulator. Such a medical simulator further comprises a channel that connects the entrance for the elongated instrument to the conveyor to guide the elongated instrument up to the conveyor and the channel has an adjustable length to follow the movement of the conveyor. In at least some medical simulators, the channel is formed by a telescopic tube. However, such a telescopic tube has a diameter that varies along its length as the telescopic tube is extended. Because the elongated instrument is usually thin, a telescopic tube presents risks of buckling for the elongated instrument since the diameter of the telescopic tube increases as the telescopic tube is extended and the diameter of a section of the extended telescopic tube may become too large to adequately guide the elongated instrument.

Therefore, there is a need for an improved conveyor-type device.

SUMMARY

According to a first broad aspect, there is provided a conveyor-type device comprising: a carriage slidably moveable along a conveyance path and defining a first channel therein; and two loops disposed on opposite sides of the path and rotatable in response to a movement of the carriage along the path to adjust the length of a second channel, the loops being configured to: rotatably engage with one another downstream from the carriage to extend the second channel as the carriage moves towards an end of the conveyance path; and rotatably disengage from one another upstream from the carriage to shorten the second channel as the carriage moves towards a beginning of the conveyance path, wherein the first channel and second channel are aligned for receiving an elongated body therein.

In one embodiment, the conveyor-type device further comprises an elongated guiding structure defining the conveyance path.

In one embodiment, the elongated guiding structure comprises a rail, the carriage being slidable along the rail.

In one embodiment, the conveyor-type device further comprises a motorized assembly for moving the carriage along the conveyance path.

In one embodiment, the motorized assembly comprises a motor, an encoder and a closed-loop strap, the closed-loop strap being rotatably mounted to the motor and the encoder and secured to the carriage so that a rotation of the strap triggers a translation of the carriage along the conveyance path.

In one embodiment, the motor, the encoder, and the closed-loop strap are positioned within one of the two loops.

In one embodiment, the closed-loop strap is provided with a stadium shape and a given straight section of the closed-loop strap is substantially parallel to the conveyance path, the carriage being secured to the given straight section.

In one embodiment, each one of the two loops is provided with a recess extending along at least a section of an external lateral face thereof to form the second channel when the two loops are engaged.

In one embodiment, the conveyor-type device further comprises two first wheels facing each other for engaging the two loops when the carriage moves towards the end of the conveyance path and disengaging the two loops when the carriage moves towards the beginning of the conveyance path.

In one embodiment, the two first wheels are positioned on opposite lateral sides of the conveyance path at the beginning thereof.

In one embodiment, the first channel extends entirely through the carriage and the loops are further configured to: rotatably disengage from one another upstream from the carriage to extend a third channel as the carriage moves towards the end of the conveyance path; and rotatably engage with one another downstream from the carriage to shorten the third channel as the carriage moves towards the beginning of the conveyance path, wherein the first channel, the second channel and the third channel are aligned for receiving the elongated body therein.

In one embodiment, the conveyor-type device further comprises two first wheels facing each other for engaging the two loops when the carriage moves towards the end of the conveyance path and disengaging the two loops when the carriage moves towards the beginning of the conveyance path, and two second wheels facing each other for engaging the two loops when the carriage moves towards the beginning of the conveyance path and disengaging the two loops when the carriage moves towards the end of the conveyance path.

In one embodiment, the two first wheels are positioned on opposite lateral sides of the conveyance path at the beginning thereof and the two second wheels are positioned on opposite lateral sides of the conveyance path at the end thereof.

In one embodiment, each one of the two loops has a first loop end mounted to a first longitudinal end of the carriage and a second loop end mounted to a second longitudinal end of the carriage.

In one embodiment, each one of the two loops comprises a chain, the chain comprising a plurality of links rotatably secured together.

In one embodiment, each one of links is provided with an instrument receiving recess on a lateral face thereof for receiving a portion of the elongated body therein.

In one embodiment, each one of links is provided with a hook and a hook receiving portion for interlocking the two loops with one another.

In one embodiment, each one of the two loops comprises a strap, the strap being flexible.

In one embodiment, the strap is provided with an instrument receiving recess on a lateral face thereof for receiving a portion of the elongated body therein.

In one embodiment, the lateral face is coated with a pressure-sensitive adhesive for engaging the two loops with one another.

According to another broad aspect, there is provided a conveyor-type device for receiving an elongated body therein, the conveyor-type device comprising: an elongated guiding structure; a carriage slidably mounted to the elongated guiding structure and extending between two opposed ends, the carriage defining a channel extending from one of the two opposite ends at least partially through the carriage; a first rotatable loop extending between two first extremities mounted to the two opposite ends of the carriage, the first rotatable loop comprising a first curved face; a second rotatable loop extending between two second extremities mounted to the two opposite ends of the carriage, the second rotatable loop comprising a second curved face, wherein the first rotatable loop and the second rotatable loop connect to each other on first and second sections thereof each adjacent a respective one of the two opposite ends of the carriage so that the first curved face and the second curved face form a first tunnel in the first section and a second tunnel in the second section, each one of the first and second tunnels being coaxial with the channel, and wherein the first and second tunnels each have a length that varies as the first and second rotatable loops rotate in response to a translation of the carriage along the elongated guiding structure.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
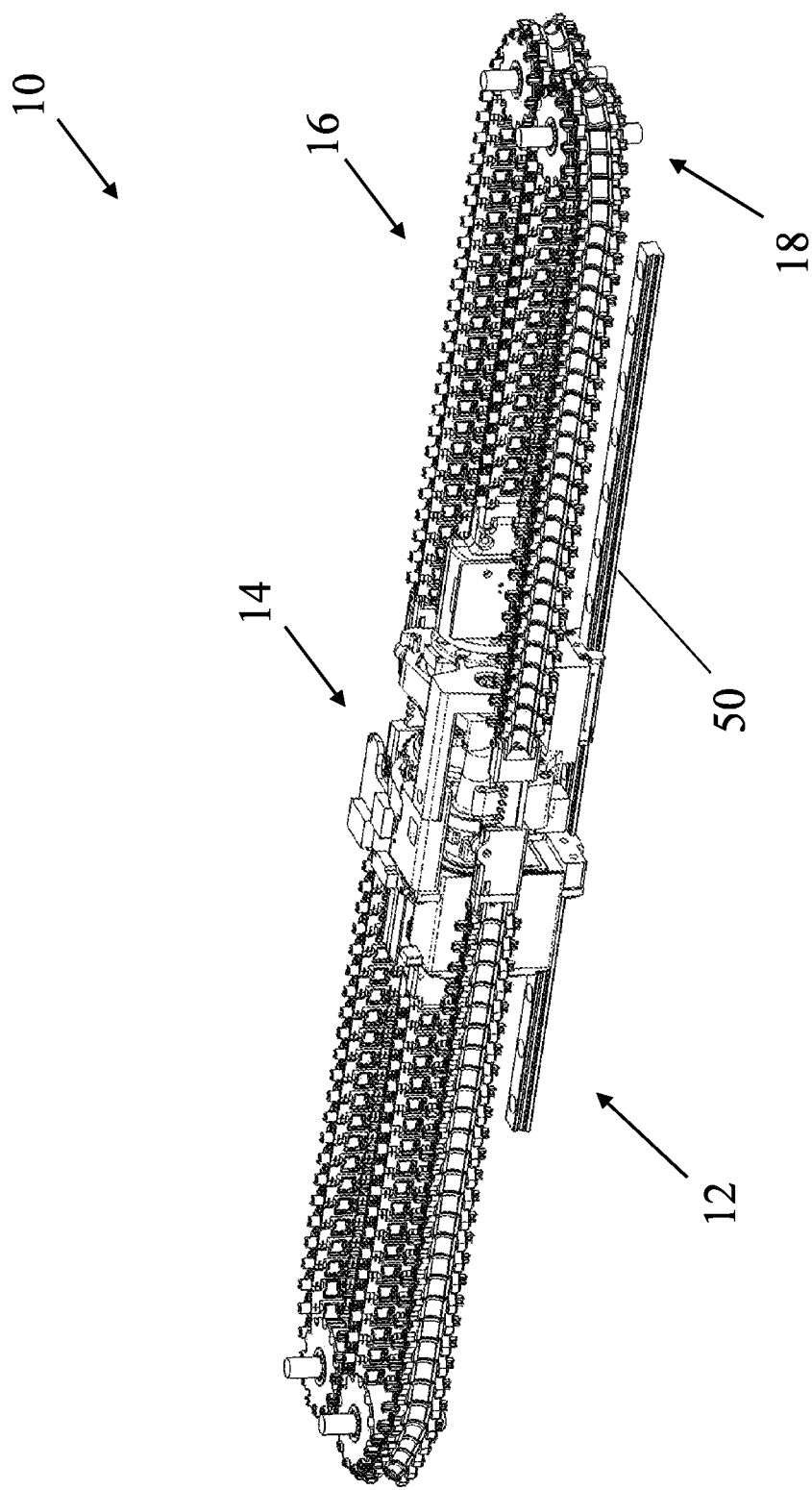
FIG. 1 is a perspective view of a conveyor-type device comprising two rotatable chains interlockable for defining a channel and a carriage movable for adjusting the length of the channel, in accordance with an embodiment.
Figure 2:
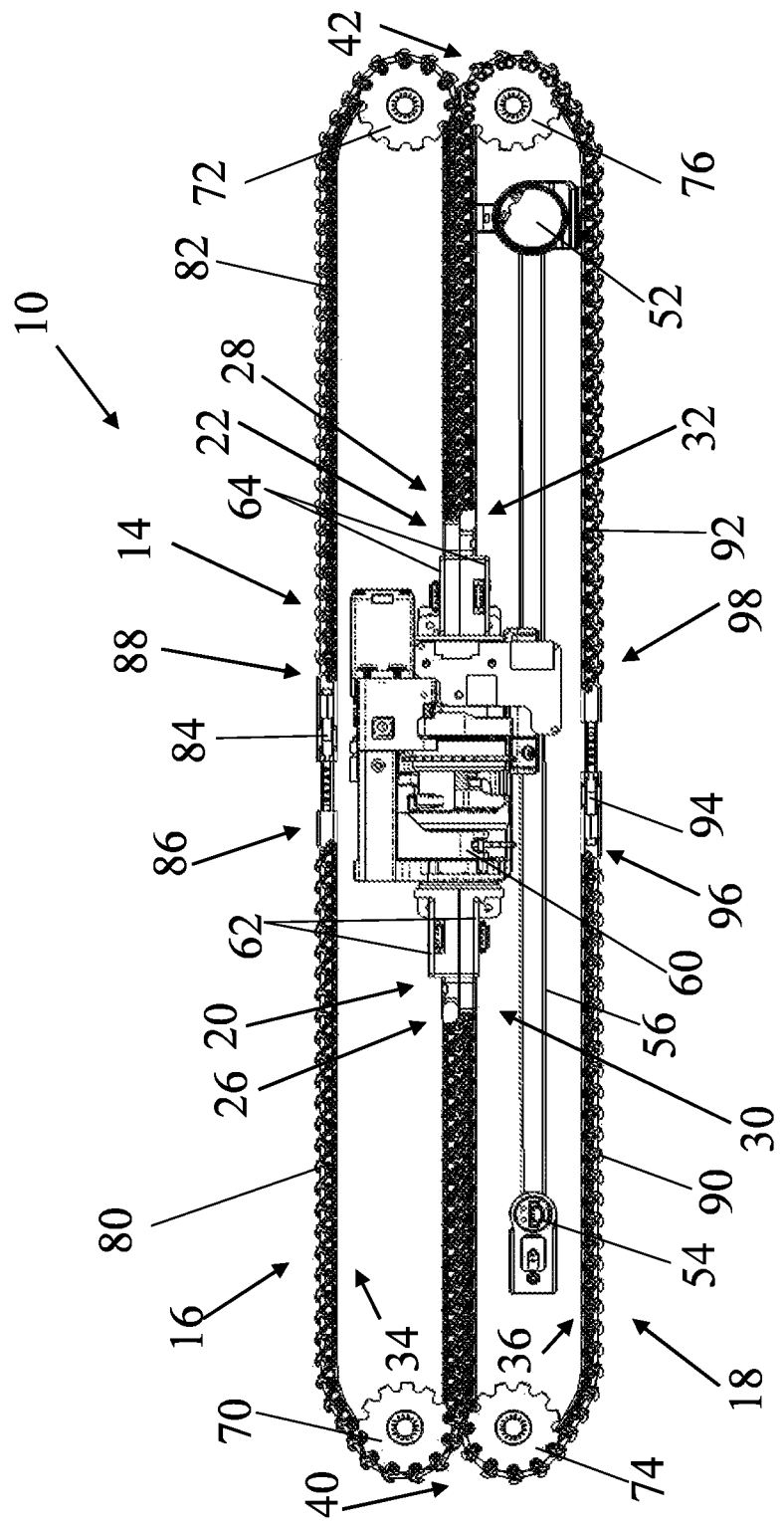
FIG. 2 is a top view of the conveyor-type device of FIG. 1.
Figure 3:
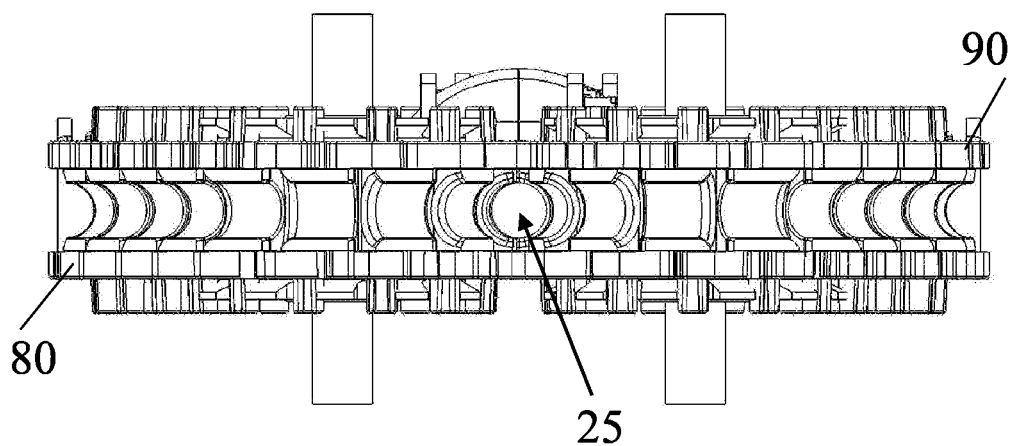
FIG. 3 is a front view of the two chains of the conveyor-type device of FIG. 1.
Figure 4:
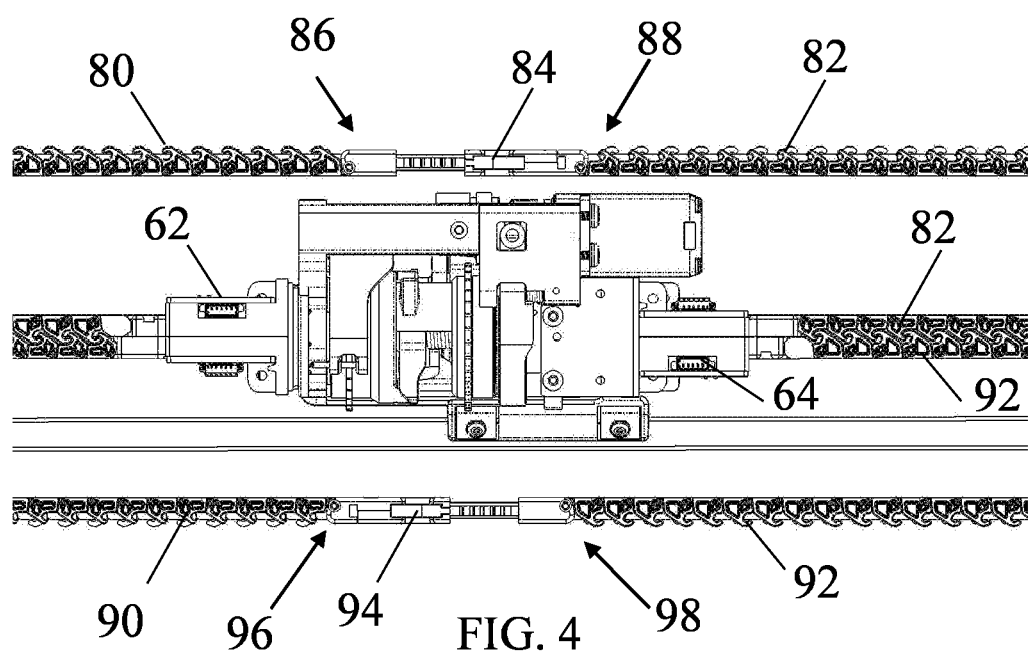
FIG. 4 is a top view of the carriage of the conveyor-type device of FIG. 1.
Figure 5:
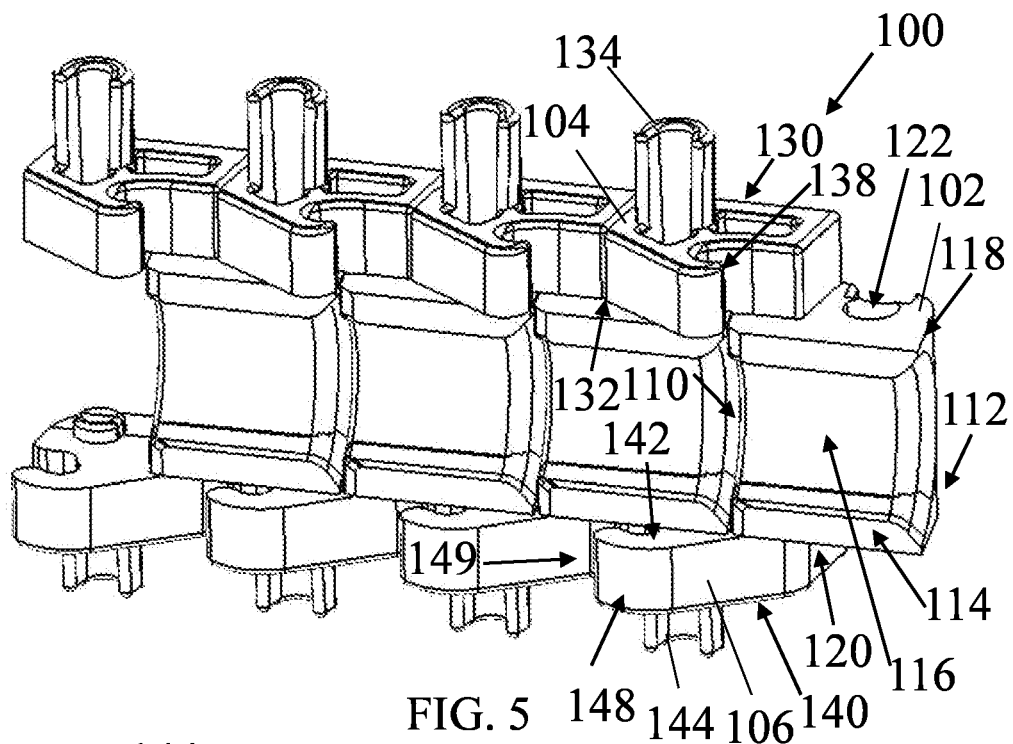
FIG. 5 is a perspective view of a link of one of the two chains of the conveyor-type device of FIG. 1, in accordance with an embodiment.
Figure 6:
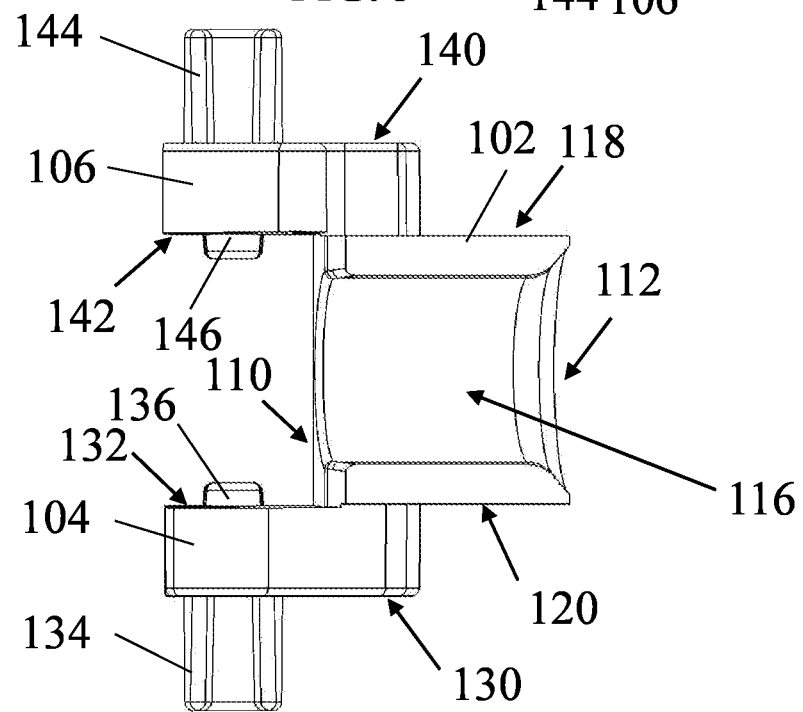
FIG. 6 is a bottom view of the link of FIG. 5.
Figure 7:
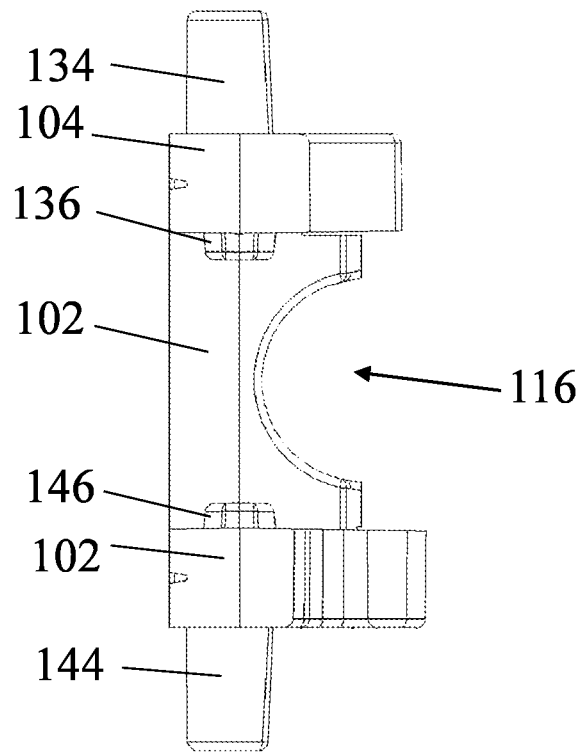
FIG. 7 is a front view of the link of FIG. 5.
Figure 8:
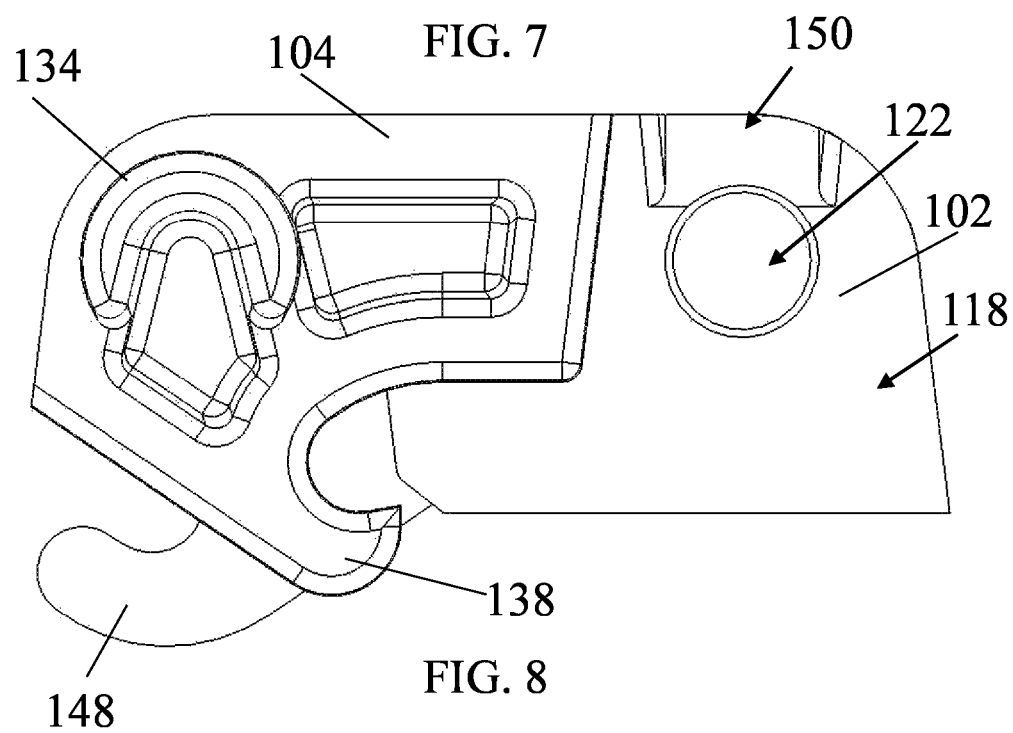
FIG. 8 is a side view of the link of FIG. 5.
Figure 9:
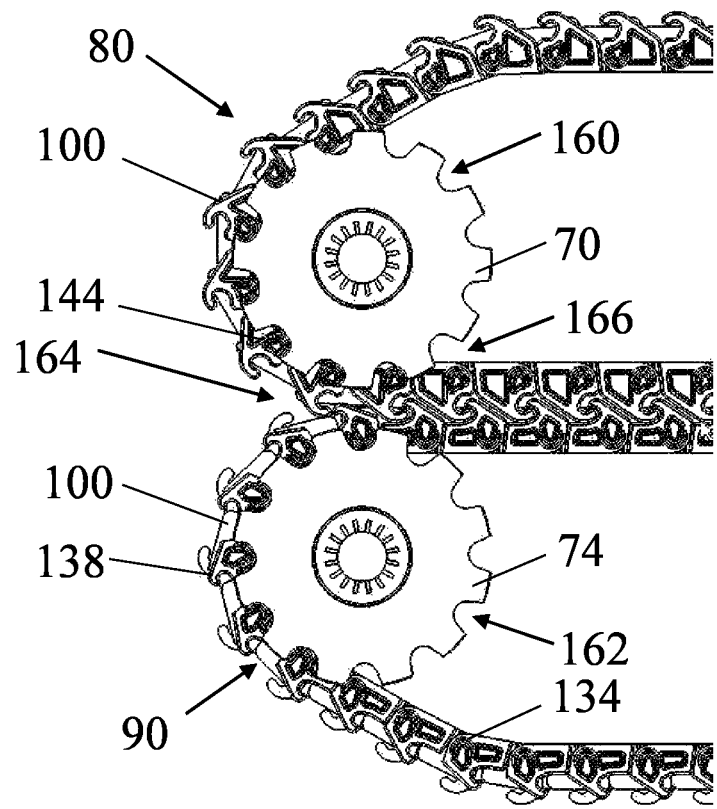
FIG. 9 is a top view of the front portions of the two chains of the conveyor-type device of FIG. 1.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

The present technology is directed towards a conveyor-type device which comprises a carriage and two loops. The carriage is slidably moveable along a conveyance path extending longitudinally between a beginning and an end. The carriage is further provided with an opening which extends at least partially through a length thereof and the opening defines a first channel which is sized and shaped for receiving therein an elongated body or instrument. The two loops are disposed on opposite lateral sides of the path and rotatable in response to a movement of the carriage along the path in order to adjust the length of a second channel which is formed when the two loops are interlocked. The loops are configured to rotatably engage with one another downstream from the carriage to extend the second channel as the carriage moves towards the end of the path. The loops are further configured to rotatably disengage from one another upstream from the carriage to shorten the second channel as the carriage moves towards the beginning of the path. The first channel and the second channel are aligned for receiving the elongated body therein.

In one embodiment, the cross-sectional size of the second channel remains constant along the length thereof independently of the length of the second channel. Such a constant cross-sectional size allows reducing the risks that the elongated body buckles while being introduced into the second channel.

In one embodiment, the two loops each comprise a chain having a first end mounted to a first longitudinal end of the carriage and a second end mounted to a second longitudinal end of the carriage. As described in greater detail below, each chain comprises links each removably securable or interlockable with a respective link of the other chain.

In another embodiment, the two loops each comprise a flexible and substantially non-extensible strap. As described in greater detail below, the two straps are removably engageable or securable to one another.

FIGS. 1-4 illustrate one embodiment of a conveyor-type device 10 be used in an exemplary application, i.e., the conveyor-type device 10 is used as a patient simulator for simulating the insertion of an elongated instrument, such as a guidewire, a catheter or the like, within a vessel of a body such as a blood vessel.

As described in greater detail below, the conveyor-type device 10 comprises a carriage 14 which is slidably moveable along a conveyance path 12 extending longitudinally between a beginning and an end. The carriage 14 is provided with a first channel (not shown) extending longitudinally through at least a portion thereof. The conveyor-type device 10 further comprises two rotatable loops 16 and 18 disposed on opposite lateral sides of the conveyance path 12, i.e., the loops 16 and 18 are each positioned on opposite sides of the longitudinal axis of the conveyance path 12. As described below, each loop 16, 18 is rotatable in response to a movement of the carriage 14 along the conveyance path 12 to adjust the length of a second channel defined by the loops 16 and 18. The first and second loops 16 and 18 are shaped so that the second channel is formed when a first section of the first loop 16 is brought into physical contact with a second section of the second loop 18 that faces the first section of the first loop 16. The loops 16 and 18 are configured to removably interlock with one another downstream from the carriage 14 to extend the second channel as the carriage 14 moves towards the end of the conveyance path 12, and rotatably disengage from one another upstream from the carriage 14 to shorten the second channel as the carriage moves towards the beginning of the conveyance path 12. The first channel defined by the carriage 14 and the second channel defined by the first and second sections of the loops 16 and 18 being brought together in physical contact are aligned for receiving the elongated instrument therein.

The conveyor-type device 10 may be referred to as an adjustable length tunnel device since the length of the second channel defined by the loops 16 and 18 is adjustable and depends on the position of the carriage 14 along the conveyance path 12.

In the illustrated embodiment, the conveyance path 12 is in the shape of an elongated guiding body 12. The carriage 14 is movably mounted on the elongated guiding body 12 so as to translate or slide along the longitudinal axis of the elongated guiding body 12.

The carriage 14 longitudinally extends between two opposite extremities 20 and 22 and an opening, hereinafter referred to as a first channel (not shown), extends through at least a section of the carriage 14. In the illustrated embodiment, the first channel extends entirely through the carriage between the two opposite ends 20 and 22. The first channel is sized and shaped for receiving at least a distal portion of the elongated instrument therein. In the illustrated embodiment, the extremity 20 of the carriage 14 faces the beginning 40 of conveyance path 12 and the extremity 22 faces the end 42 of conveyance path 12. The beginning 40 of the conveyance path corresponds to a beginning of the conveyor-type device 10 and to the entrance through which the elongated instrument is inserted. The end 42 of the conveyance path corresponds to the end of the conveyor-type device 10.

The rotatable loops 16 and 18 are mounted on opposite lateral sides of the carriage 14. The first rotatable loop 16 extends between a first end 26 and a second end 28 respectively secured to the ends 20 and 22 of the carriage 14, and the second rotatable loop 18 extends between a first end 30 and a second end 32 respectively secured to the ends 20 and 22 of the carriage 16. As a result, any motion of the carriage 14 along the elongated guiding structure 12 triggers a rotation of the first and second loops 16 and 18. Similarly, any rotation of the first loop 16 and/or the second loop 18 triggers a translation of the carriage along the elongated guiding structure 12.

In the illustrated embodiment, the first and second loops 16 and 18 are connected together along a first section thereof located between the beginning 40 of the conveyor-type device 10 and the end 20 of the carriage 14, and along a second section thereof between the end 42 of the conveyor-type device 10 and the end 22 of the carriage 14. The first loop 16 is provided with an external contact face 34 that extends along the length thereof between the ends 26 and 28, and the second loop 18 is provided with an external contact face 36 that extends along the length thereof between the ends 30 and 32. The contact faces 34 and 36 are shaped so as to form a channel when connected together. In the first section of the loops 16 and 18 located between the beginning 40 and the carriage 14, the faces 34 and 36 of the loops 16 and 18 face each other and are connected together so as to define the second channel. Similarly, in the second section of the loops 16 and 18 located between the end 42 and the carriage 14, the faces 34 and 36 of the loops 16 and 18 face each other and are connected together so as to define a third channel. The second and third channels are each shaped and sized so as to receive a portion of the elongated instrument therein and are each aligned with the first channel of the carriage 14. The first channel and the second and third channels form together a longitudinal channel or tunnel 25 which has a fixed length and extends between the beginning 40 and the end 42 of the conveyor-type device 10. It should be understood that the beginning 40 of the conveyor-type device 10 corresponds to the beginning or first end of the channel 25, and the end 42 of the conveyor-type device 10 corresponds to the exit or second end of the channel 25. While the length of the first channel is fixed, the length of the second tunnel, which corresponds to the distance between the end 20 of the carriage 14 and the first end 40 of the tunnel 25, and the length of the third channel, which corresponds to the distance between the end 22 of the carriage 14 and the second end 42 of the tunnel 25, vary as a function of the position of the carriage 14 along the elongated guiding structure 12. Moving the carriage 14 towards the first end 40 reduces the length of the second channel while increasing the length of the third channel. Inversely, moving the carriage 14 towards the end 42 increases the length of the second channel while decreasing the length of the third channel.

In the following, the device 10 is described in greater detail. However, it should be understood that modifications are possible. In the illustrated embodiment, the elongated guiding structure 12 comprises a rail 50 which defines the conveyance path and extends longitudinally along the longitudinal axis of the guiding structure 12. The carriage 14 is movably mounted to the rail 50 so as to be slidable or translatable along the rail 50.

The device 10 is further provided with a motorized assembly for moving the carriage along the guiding structure 12, i.e., along the rail 50. In the illustrated embodiment, the motorized assembly comprises a motor 52, an encoder 54 and a strap 56. The strap 56 is rotatably mounted to the motor 52 and the encoder 54 so as to form a closed loop which rotates about the motor 52 and the encoder 54. When mounted to the motor 52 and the encoder 54, the strap 56 is provided with a stadium shape, i.e., a rectangular shape with rounded ends. A given one of the two straight sides of the strap 56 extends substantially parallel to the rail 50, even though other configurations may be possible. Furthermore, the carriage 14 is fixedly mounted to the given side of the strap 56. As a result, when the motor 52 is activated, the strap 56 rotates about the motor 52 and the encoder 54 and the carriage 14 translates along the rail 50. It should be understood that the distance along which the carriage 14 may translate on the rail 50 is defined by the position of the motor 52 and the encoder 54 relative to the rail 50. In the illustrated embodiment in which the given side of the strap 56 is substantially parallel to the rail 50, the distance along which the carriage 14 may translate on the rail 50 is defined by the length of the given side of the strap 56.

While in the illustrated embodiment the motor 52, the encoder 54 and the strap 56 are positioned within the loop 18, it should be understood that the motor 52, the encoder 54 and the strap 56 are positioned within the loop 16.

It should also be understood that the illustrated motorized assembly is exemplary only and that any adequate motorized device or assembly configured for translating the carriage 14 along the rail 50 may be used. Alternatively, the motorized assembly may be omitted, and the carriage may be manually moved along the rail 50.

In the illustrated embodiment, the carriage 14 is provided with a capturing device 60 configured for removably capturing an elongated instrument once inserted into the first channel of the carriage 14. The capturing device 60 is operatively mounted to the first channel so as to be able to capture the elongated instrument.

In the illustrated embodiment, the carriage 14 is further provided with a first sensor 62 and a second sensor 64. The first sensor 62 is mounted on the carriage 14 adjacent the end 20 thereof and the second sensor 64 is mounted on the carriage 14 adjacent the end 22 thereof. The sensors 62 and 64 are each operatively mounted to the first channel so as to detect the presence of an elongated instrument into the first channel. The first sensor 62 is configured for detecting the presence of the elongated instrument at the end 20 of the first channel and the second sensor 64 is configured for detecting the presence of the elongated instrument at the end 22 of the first channel. In one embodiment, the capturing device 60 is activated when both sensors 62 and 64 each detect the presence of an elongated instrument in the first channel to ensure that the elongated instrument has crossed the carriage 14. In another embodiment, the capturing device 60 is activated when only one of the two sensors 62 and 64 detects the presence of the elongated instrument in the first channel. In this case, it will be understood that the position of the sensors 62 and 64 along the first channel may vary. It will also be understood that one of the two sensors 62 and 64 may be omitted.

In one embodiment, the sensor 62 and/or 64 is further configured for measuring the cross-sectional dimension of the elongated instrument, such as the diameter of a cylindrical elongated instrument. When an elongated instrument having a given cross-sectional dimension must be captured by the capturing device 60, the cross-sectional size measured by the sensor 62 and/or 64 is compared to the given cross-sectional dimension and if the measured cross-sectional dimension corresponds to the given cross-sectional dimension, then the capturing device 60 is activated.

It should be understood that any adequate capturing device 60 may be used. For example, clamps adapted to capture an elongated device may be used. In another example, the capturing device 60 may comprise an iris coaxially positioned with the first channel for capturing the elongated instrument.

Similarly, it should be understood that any adequate sensor 62, 64 for detecting the presence of an elongated instrument within the first channel may be used. For example, the sensor 62, 64 may be an optical sensor comprising a light source and a light detector positioned opposite the light source relative to the first channel so that when the shadow of the elongated instrument be on the light detector. In this case, the larger the instrument is, the less optical power/amplitude detected by the sensor is. The elongated instrument is considered to be detected when the optical power measured by the sensor 62, 64 is below a given threshold. The sensor 62, 64 may further be calibrated to associate a given measured optical power to a respective cross-sectional dimension.

Referring back to FIGS. 1 and 2, the device 10 comprises four gear wheels 70, 72, 74 and 76. The first loop 16 comprises a first chain or chain section 80, a second chain or chain section 82 and a ratchet 84 for connecting the first and second chains 80 and 82 together. Similarly, the second loop 18 comprises a first chain or chain section 90, a second chain or chain section 92 and a ratchet 94 for connecting the first and second chains 90 and 92 together.

The first chain 80 of the loop 16 extends between a first end 86 connected to the ratchet 84 and a second end which is connected to the carriage 14 and corresponds to the end 26 of the loop 16. The second chain 82 of the loop 16 extends between a first end 88 connected to the ratchet 84 and a second end which is connected to the carriage 14 and corresponds to the end 28 of the loop 16.

The first chain 90 of the loop 18 extends between a first end 96 connected to the ratchet 94 and a second end which is connected to the carriage 14 and corresponds to the end 30 of the loop 18. The second chain 92 of the loop 18 extends between a first end 98 connected to the ratchet 84 and a second end which is connected to the carriage 14 and corresponds to the end 32 of the loop 18.

The gear wheels 70 and 74 are located adjacent the end 40 of the elongated tunnel 25, and the gear wheels 72 and 76 are positioned adjacent the end 42 of the elongated tunnel 25. The gear wheels 70, 72, 74 and 76 are all located adjacent the longitudinal axis of the elongated tunnel 25. The gear wheels 70 and 72 are located on a first side of the longitudinal axis of the elongated tunnel 25 while the gear wheels 74 and 76 are located on an opposite side of the longitudinal axis of the elongated tunnel 25. As a result of the particular arrangements of the gear wheels 70-76, the gear wheel 70 faces the gear wheel 74 on opposite sides of the longitudinal axis of the elongated channel 25 at the end 40 thereof, and the gear wheel 72 faces the gear wheel 76 on opposite sides of the longitudinal axis of the elongated channel 25 at the end 42 thereof.

The first chain 80 of the loop 16 is rotatably mounted to the gear wheel 70 so that a motion of the first chain 80 triggers a rotation of the gear wheel 70. The second chain 82 of the loop 16 is rotatably mounted to the gear wheel 72 so that a motion of the first chain 82 triggers a rotation of the gear wheel 72. The first chain 90 of the loop 18 is rotatably mounted to the gear wheel 74 so that a motion of the first chain 90 triggers a rotation of the gear wheel 74. The second chain 92 of the loop 18 is rotatably mounted to the gear wheel 76 so that a motion of the first chain 92 triggers a rotation of the gear wheel 76.

The first and second loops 16 and 18 are each provided with a substantially stadium shape. The two sections of the first loop 16 extending between the gear wheels 70 and 72 are substantially straight while the two sections of the loop 16 each extending around a respective gear wheel 70, 72 are substantially rounded. Similarly, the two sections of the second loop 18 extending between the gear wheels 74 and 76 are substantially straight while the two sections of the second loop 18 each extending around a respective gear wheel 74, 76 are substantially rounded.

As described in greater detail below, the first chain 80 of the first loop 16 and the first chain 90 of the second loop 18 are interlockable with one another. Similarly, the second chain 82 of the first loop 16 and the second chain 92 of the second loop 18 are interlockable with one another. The interlocking of the chains 80 and 90 is performed by the gear wheels 70 and 74 of which the distance between the two is adequately chosen, e.g., the distance between the gear wheels 70 and 74 along an axis orthogonal to the longitudinal axis of the elongated tunnel 25 is substantially equal to the summation of the thicknesses of the chains 80 and 90. Similarly, the interlocking of the chains 82 and 92 is performed by the gear wheels 72 and 76 of which the distance between the two is adequately chosen, e.g., the distance between the gear wheels 72 and 76 along an axis orthogonal to the longitudinal axis of the elongated tunnel 25 is substantially equal to the summation of the thicknesses of the chains 82 and 92.

The first ratchet 84 allows for adjusting the distance between the end 86 of the first chain 80 and the end 88 of the second chain 82 in order to adjust the tension in the first loop 16. Similarly, the second ratchet 94 allows for adjusting the distance between the end 96 of the first chain 90 and the end 98 of the second chain 92 in order to adjust the tension in the second loop 18.

The external lateral face of the chain 80 and the external lateral face of the chain 90, which are removably secured together when the chains 80 and 90 are interlocked with one another, are each provided with a recess that extends along the length of the chain 80, 90. When the external lateral faces of the chains 80 and 90 are removably secured together via the interlocking of the chains 80 and 90 along a first section comprised between the gear wheels 70 and 74 and the end 20 of the carriage 14, the external lateral faces face each other and form the second channel which is coaxial and aligned with the first channel of the carriage 14.

The external lateral face of the chain 82 and the external lateral face of the chain 92, which are removably secured together when the chains 82 and 92 are interlocked with one another, are each provided with a recess that extends along the length of the chain 82, 92. When the external lateral faces of the chains 82 and 92 are removably secured together via the interlocking of the chains 82 and 92 along a second section comprised between the gear wheels 72 and 76 and the end 22 of the carriage 14, the external lateral faces face each other and form the third channel which is coaxial with the first channel of the carriage 14. As described above, the first channel, the second channel and the third channel form together the elongated tunnel 25 which extends substantially continuously between the ends 40 and 42.

In one embodiment, the recess present on the lateral faces of the chains 80, 82, 84, 86 has a hemi-circular cross-sectional shape so that the second and third channels are each provided with a circular cross-sectional shape. Furthermore, the first channel is also provided with a circular cross-sectional shape so that the elongated tunnel 25 is provided with a circular cross-sectional shape along its entire length. In addition, the dimension of the recess present on the lateral faces of the chains 80, 82, 84, 86 may be chosen so that the second and third channels each have the same diameter as that of the first channel so that the elongated tunnel 25 is provided with a constant diameter along a length thereof.

It should be understood that each chain 80, 82, 90, 92 comprises a plurality of links rotatably secured together and the gear wheels 70-76 are each provided with protrusions or teeth on their circular edge that each engage with the links of the chain 80, 82, 90, 92, as known in the art, to ensure that a motion of a chain 80, 82, 90, 92 triggers a rotation of a given gear wheel 70, 72, 74, 76, and vice versa.

It should also be understood that each link of the chain 80, 82, 90, 92 is provided with a lateral face having a recess so as to form the recess that extends along the lateral face of the chain 80, 82, 90, 92. In one embodiment, each link of the chain 80, 82, 90, 92 is provided with a hook and a hook-receiving recess to receive the hook of another link. For example, when the chains 80 and 90 interlock with each other between the gear wheels 70 and 74, the hook of a given link of the chain 80 is inserted into the hook-receiving recess of a respective link of the chain 90 while the hook-receiving recess of the given link of the chain 80 receives therein the hook of the respective link of the chain 90, thereby removably securing the two links together thanks to the tension in the chains 80 and 90.

In operation, the device 10 configured for simulating a patient simulator operates as follows. The distal end of an elongated instrument is inserted into the elongated tunnel 25 via the end 40 for example and penetrates into the second channel until reaching the end 20 of the carriage 14 where it is detected by the first sensor 62. Then the distal end of the elongated instrument penetrates into the first channel of the carriage until reaching the end 22 thereof where it is detected by the second sensor 64. Upon detection of the elongated instrument by the two sensors 62 and 64, the capturing device 60 is activated to capture the elongated instrument within the carriage 14. The elongated instrument is then removably secured to the carriage 14 and haptic feedback can be applied to the elongated instrument. For example, the motor 52 can be activated to push or pull on the elongated instrument.

In one embodiment, the present device 10 ensures that the cross-sectional shape and size of the second and third channels remains substantially constant independently of the lengths of the second and third channels which vary according to the position of the carriage 14 along the rail 50. If the second and third channels and the first channel have the same cross-sectional shape and size, the device 10 ensures that the cross-sectional shape and size of the elongated tunnel 25 (which is formed of the first, first and third channels) remain constant independently of the position of the carriage 14 along the rail 50. This feature allows preventing any buckling of the elongated instrument while it is inserted into the elongated tunnel 25.

In one embodiment, the device 10 further comprises a frame (not shown) defining a cavity and longitudinally extending between two opposite faces each provided with an aperture that faces the elongated channel 25 so as to allow the insertion of the elongated instrument through the frame into the channel 25. In this case, all the components of the device 10 are mounted into the frame. Particularly, the elongated guiding structure 12 is fixedly secured to the frame and the gear wheels are rotatably secured to the frame.

While in the above description the carriage 14 is provided with an aperture at its both ends 20 and 22 so that the first channel extends through the entire carriage, it should be understood that the carriage 14 may be provided with a single aperture located at the end 20 or 22. For example, only the end 20 of the carriage 14 may be provided with an aperture so that the elongated tunnel only comprises the second channel and the first channel.

While the first and second loops 16 and 18 are each provided with a ratchet 84, 94, it should be understood that the ratchets 84 and 94 may be omitted. In this case, the first loop 16 comprises a single chain extending between a first end connected to the end 20 of the carriage 14 and a second end connected to the end 22 of the carriage 14. Similarly, the second loop 18 comprises also a single chain extending between a first end connected to the end 20 of the carriage 14 and a second end connected to the end 22 of the carriage 14.

In the following an exemplary link 100 for the chains 80, 82, 90, 92 is described with reference to FIGS. 5-8. The link 100 comprises a central portion 102, a hook portion 104 and a hook-receiving portion 106. The central portion 102 extends longitudinally between a first end 110 and a second end 112 and comprises a lateral face 114 which extends between the ends 110 and 112 and is provided with a hemi-cylindrical recess 116. The central portion 102 also comprises a first side face 118 and a second side face 120 which both extend between the first and second ends 110 and 112 adjacent the lateral face 114. The side faces 118 and 120 are each provided with a circular recess 122 adjacent the end 112 of the central portion 102.

The hook portion 104 projects longitudinally from the end 110 of the central portion 102. The hook portion 104 extends laterally between an external side face 130 and an internal side face 132 which is opposite to the external side face 130 and secured to the side face 118 of the central portion 102. The external side face 130 of the hook portion 104 is provided with a curved protrusion 134 that projects therefrom and the internal side face 132 is provided with a cylindrical protrusion 136 that matches the recess 122 of the face 118 of the central portion 102 so as to be inserted therein. The hook portion 104 defines a hook 138 that projects in direction of the end 112 of the central portion 102 and extends between the sides faces 130 and 132.

The hook-receiving portion 106 projects longitudinally from the end 110 of the central portion 102. The hook portion 106 extends between an external side face 140 and an internal side face 142 which is opposite to the external side face 140 and secured to the side face 120 of the central portion 102. The external side face 140 of the hook-receiving portion 106 is provided with a curved protrusion 144 that projects therefrom and the internal side face 142 is provided with a cylindrical protrusion 146 that matches the recess 122 of the face 120 of the central portion 102 so as to be inserted therein. The hook-receiving portion 106 comprises a curved protrusion 148 that projects in a direction opposite to the hook 138 of the hook portion 104, extends between the side faces 140 and 142 and defines a curved recess 149.

The curved protrusion 148 is shaped and sized so that the hook 138 of the hook portion 104 is insertable into the curved recess 149. The curved protrusions 134 and 144 are shaped and sized so as to engage with recesses provided in a gear wheel as described below. The distance between the side faces 118 and 120 of the central portion 102 is chosen to be at most equal to the distance between the internal side face 132 of the hook portion 104 and the internal side face 142 of the hook-receiving portion 106.

In the illustrated embodiment, the curved protrusions 134 and 144 are identical and the cylindrical protrusions 136 and 146 are also identical.

As described above, the link 100 can be used for creating a chain 80, 82, 90, 92 by connecting together a plurality of links 100. In order to removably secure together two links 100, the central portion 102 of a first link 100 is inserted between the internal side walls 132 and 142 of a second link 100 while inserting the cylindrical protrusions 136 and 146 of the second link 100 each into a respective recess 122 of the first link 100. Thanks to the cylindrical shape of the protrusions 136 and 146 and the recesses 122, the first and second links are rotatably secured together, i.e., the first link 100 may rotate relative to the second link 100 about a rotation axis that passes by the centers of the two cylindrical protrusions 136 and 146.

In the illustrated embodiment, the side faces 118 and 120 of the central portion 102 are each provided with an optional angled recess 150 connected to the cylindrical recess 122 for allowing an easy insertion of the cylindrical protrusion 136, 146 into a recess 122.

While in the illustrated embodiment, the protrusions 136 and 146 are located on the internal side faces 132 and 142, respectively, and the recesses 122 are located on the side faces 118 and 120, it will be understood that a reverse configuration is possible, i.e., the side faces 118 and 120 may each be provided with a protrusion such as protrusion 136, 146 and the internal side faces 132 and 142 and each be provided with a recess such as recess 122 in order to rotatably secure two links 100 together.

Figure 10:
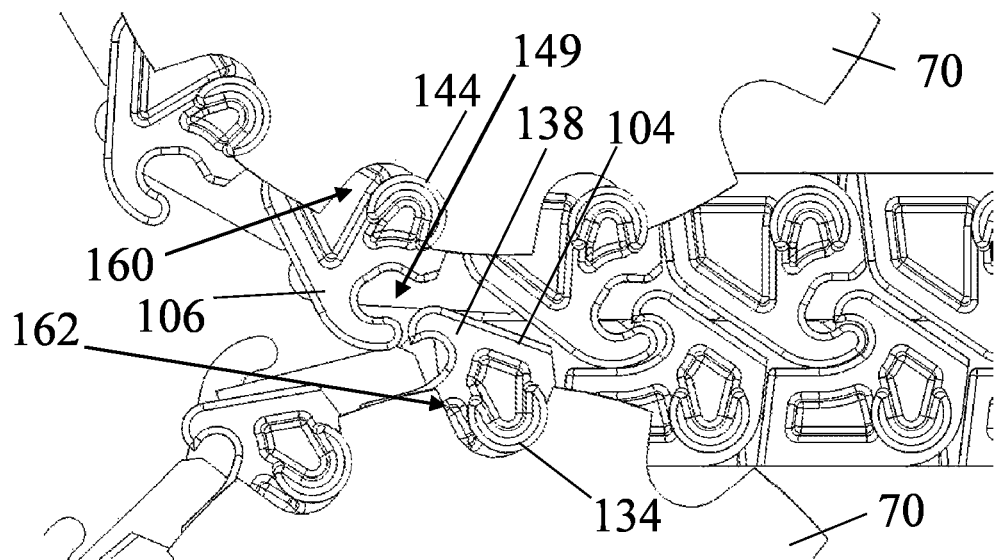
FIG. 10 illustrates the interlocking of the links of FIG. 5 occurring at the front portions of the two chains of FIG. 9.

FIGS. 10 and 11 illustrate the interlocking of the chains 80 and 90 when the chain 80 is formed of a plurality of first links 100 and the chain 90 is formed a plurality of second links 100. The chain 80 is mounted to the gear wheel 70 which is provided with a plurality of recesses 160 located about the circumference of the outer edge of the gear wheel 70. Similarly, the chain 90 is mounted to the gear wheel 74 which is provided with a plurality of recesses 162 located about the circumference of the outer edge of the gear wheel 70. Each recess 160, 162 is shaped and sized for receiving therein a curved protrusion 134, 144. In the illustrated embodiment, the recess 160, 162 is provided with a substantially hemi-circular shape.

The chain 80 is mounted to the gear wheel 70 so that when the carriage 14 translates away from the gear wheel 70, the gear wheel 70 rotates anti-clockwise and the curved protrusion 144 of successive first links 100 of the chain 80 is received within a respective recess 160 of the gear wheel 70. Similarly, the chain 90 is mounted to the gear wheel 74 so that when the carriage 14 translates away from the gear wheel 74, the gear wheel 74 rotates clockwise and the curved protrusion 134 of successive second links 100 of the chain 90 is received within a respective recess 160 of the gear wheel 70.

Once its curved protrusion 144 is received in a respective recess 160, a given first link 100 of the chain 80 follows the rotation of the gear wheel 70 until approaching a connection region 164 located adjacent the axis that passes by the centers of rotation of the gear wheels 70 and 74. Similarly, once its curved protrusion 134 is received in a respective recess 160, a given second link 100 of the chain 90 follows the rotation of the gear wheel 74 until approaching the connection region 164. The hook 138 of the given second link 100 of the chain 90 is introduced into the recess 149 of the given first link 100 of the chain 80 while the given first and second links 100 move within the connection region 164, thereby removably securing or interlocking the given first and second links 100 together. Once they have passed the longitudinal axis that passes by the centers of rotation of the gear wheels 70 and 74, the given first and second links 100 are removably secured or interlocked together.

It should be understood that the shape, size and location within the link 100 of the hook 138 and the recess 149 are chosen so as allow the insertion of the hook 138 of a link of the chain 90 into the recess 149 of a respective link 100 of the chain 80. Furthermore, in order to provide a smooth insertion, an offset is present between a first link 100 of the chain 80 and its corresponding second link 100 of the chain 90 to which it is to be interlocked within the connection region 164. The offset between a first link 100 of the chain 80 and its corresponding second link 100 of the chain 90 is defined by an offset between the gear wheels 70 and 74.

An offset between the gear wheels 70 and 74 is created when the following condition exists: when the center of a recess 162 of the gear wheel 74 is located on the transverse axis that passes by the centers of rotation of the gear wheels 70 and 74, the center of any recess 160 of the gear wheel 70 is not located on the transverse axis. The offset between the gear wheels 70 and 74 can be characterized by an offset angle α between a first axis and a second axis, the first axis being the axis that passes by the center of rotation of the wheel 70 and the center of the recess 160 of the first link of the chain 80 that is located in the connection region, and the second axis corresponding to the transverse axis (i.e. the axis that passes by the centers of rotation of the wheels 70 and 74) when the center of the recess 162 of the second link of the chain 90 is located on the transverse axis.

In one embodiment, the offset angle α is equal to about 15 degrees.

When the carriage is translated towards the gear wheels 70 and 74, the gear wheel 70 rotates clockwise while the gear wheel 74 rotates anti-clockwise, and the removably connected links of the chains 80 and 90 moves towards the gear wheels 80 and 90. When a given first link 100 of the chain 80 and a given second link 100 of the chain 90, which are connected together, penetrate a disconnection region 166 which faces the carriage 14 and is located adjacent the axis that passes by the centers of rotation of the gear wheels 70 and 74, the curved protrusion 144 of the given first link 100 of the chain 80 is received within a respective recess 160 of the gear wheel 70 and the curved protrusion 134 of the given second link 100 of the chain 90 is received within a respective recess 160 of the gear wheel 70.

Once its curved protrusion 144 is received in a respective recess 160, the given first link 100 of the chain 80 follows the rotation of the gear wheel 70. Similarly, once its curved protrusion 134 is received in a respective recess 160, the given second link 100 of the chain 90 follows the rotation of the gear wheel 74. The hook 138 of the given second link 100 of the chain 90 disengages from the recess 149 of the given first link 100 of the chain 80 while the given first and second links 100 move within the disconnection region 166, thereby disengaging the given first link of the chain 80 from the given second link of the chain 90.

The person skilled in the art will understand that the particular arrangement of the wheels 70 and 76 with the chains 80 and 90 is replicated for the gear wheels 72 and 76 and the chains 82 and 92 so that the interlocking and disengaging of the chains 82 and 92 is similar to those of the chains 80 and 90.

While in the above description, the loops 16 and 18 each comprise a chain assembly formed of links 100, it should be understood that any adequate loops each provided with an instrument receiving recess on a lateral face thereof may be used as long as an instrument receiving channel such as the above-described second channel is formed when the two loops are brought into in physical contact.

For example, each loop 16, 18 may comprise a flexible and substantially non-extensible strap. Each strap may be provided with a substantially rectangular cross-sectional shape and may be made of rubber for example. Each strap is provided with an instrument receiving recess such as a hemi-cylindrical recess on a lateral face thereof. A first strap is mounted around the wheels 70 and 72 and has a first end secured to the end 20 of the carriage 14 and a second end secured to the end 22 of the carriage 14. Similarly, the other strap is mounted around the wheels 74 and 76 and has a first end secured to the end 20 of the carriage 14 and a second end secured to the end 22 of the carriage 14.

In one embodiment, for each strap, the non-recessed portion of the lateral face that comprises the instrument receiving recess is provided or coated with a pressure-sensitive adhesive to ensure a removable securing of the portions of the two straps that are brought into physical contact upon rotation of the wheels 70, 72, 74 and 76.

While in the above description the two loops 16 and 18 interlock with each other on both sides of the carriage 14, it should be understood that the interlocking of the loops 16 and 18 may occur only on one side of the carriage. For example, the wheels 72 and 76 may be spaced apart such that no interlocking of the loops 16 and 18 occur between the wheels 72 and 76 when the carriage moves towards the beginning 40 of the conveyance path. In this case, no third channel is created.

While the above-described conveyor-type device is described in the context of a medical simulator and is adapted to capture the elongated instrument inserted thereinto, it will be understood that the conveyor-type device may have other applications. For example, the above-described conveyor-type device may be adapted to measure the cross-section of an elongated body inserted thereinto. In this case, the first channel extends through the whole length of the carriage and the carriage is provided with a sensor adapted to measure the cross-section of the elongated body. In operation, the carriage is moved along the conveyance path and the cross-sectional dimension of the elongated body may be measured at different position along the length thereof.

Modifications and improvements to the above-described implementations of the present technology may become apparent to those skilled in the art. The foregoing description is intended to be exemplary rather than limiting.

What is claimed is:

1. A conveyor-type device comprising:
   a carriage slidably moveable along a conveyance path and defining a first channel therein; and
   two loops disposed on opposite sides of the path and rotatable in response to a movement of the carriage along the path to adjust the length of a second channel, the loops being configured to:
   rotatably engage with one another downstream from the carriage to extend the second channel as the carriage moves towards an end of the conveyance path; and
   rotatably disengage from one another upstream from the carriage to shorten the second channel as the carriage moves towards a beginning of the conveyance path,
   wherein the first channel and second channel are aligned for receiving an elongated body therein.

2. The conveyor-type device of claim 1, further comprising an elongated guiding structure defining the conveyance path.

3. The conveyor-type device of claim 2, wherein the elongated guiding structure comprises a rail, the carriage being slidable along the rail.

4. The conveyor-type device of claim 1, further comprising a motorized assembly for moving the carriage along the conveyance path.

5. The conveyor-type device of claim 4, wherein the motorized assembly comprises a motor, an encoder and a closed-loop strap, the closed-loop strap being rotatably mounted to the motor and the encoder and secured to the carriage so that a rotation of the strap triggers a translation of the carriage along the conveyance path.

6. The conveyor-type device of claim 5, wherein the motor, the encoder and the closed-loop strap are positioned within one of the two loops.

7. The conveyor-type device of claim 6, wherein the closed-loop strap is provided with a stadium shape and a given straight section of the closed-loop strap is substantially parallel to the conveyance path, the carriage being secured to the given straight section.

8. The conveyor-type device of claim 1, wherein each one of the two loops is provided with a recess extending along at least a section of an external lateral face thereof to form the second channel when the two loops are engaged.

9. The conveyor-type device of claim 1, further comprising two first wheels facing each other for engaging the two loops when the carriage moves towards the end of the conveyance path and disengaging the two loops when the carriage moves towards the beginning of the conveyance path.

10. The conveyor-type device of claim 9, wherein the two first wheels are positioned on opposite lateral sides of the conveyance path at the beginning thereof.

11. The conveyor-type device of claim 1, wherein the first channel extends entirely through the carriage and the loops are further configured to:
   rotatably disengage from one another upstream from the carriage to extend a third channel as the carriage moves towards the end of the conveyance path; and
   rotatably engage with one another downstream from the carriage to shorten the third channel as the carriage moves towards the beginning of the conveyance path,
wherein the first channel, the second channel and the third channel are aligned for receiving the elongated body therein.

12. The conveyor-type device of claim 11, further comprising two first wheels facing each other for engaging the two loops when the carriage moves towards the end of the conveyance path and disengaging the two loops when the carriage moves towards the beginning of the conveyance path, and two second wheels facing each other for engaging the two loops when the carriage moves towards the beginning of the conveyance path and disengaging the two loops when the carriage moves towards the end of the conveyance path.

13. The conveyor-type device of claim 12, wherein the two first wheels are positioned on opposite lateral sides of the conveyance path at the beginning thereof and the two second wheels are positioned on opposite lateral sides of the conveyance path at the end thereof.

14. The conveyor-type device of claim 1, wherein each one of the two loops has a first loop end mounted to a first longitudinal end of the carriage and a second loop end mounted to a second longitudinal end of the carriage.

15. The conveyor-type device of claim 1, wherein each one of the two loops comprises a chain, the chain comprising a plurality of links rotatably secured together.

16. The conveyor-type device of claim 15, wherein each one of links is provided with an instrument receiving recess on a lateral face thereof for receiving a portion of the elongated body therein.

17. The conveyor-type device of claim 1, wherein each one of the two loops comprises a strap, the strap being flexible.

18. The conveyor-type device of claim 17, wherein the strap is provided with an instrument receiving recess on a lateral face thereof for receiving a portion of the elongated body therein.

19. The conveyor-type device of claim 17, wherein the lateral face is coated with a pressure-sensitive adhesive for engaging the two loops with one another.

20. A conveyor-type device for receiving an elongated body therein, the conveyor-type device comprising:
   an elongated guiding structure;
   a carriage slidably mounted to the elongated guiding structure and extending between two opposed ends, the carriage defining a channel extending from one of the two opposite ends at least partially through the carriage;
   a first rotatable loop extending between two first extremities mounted to the two opposite ends of the carriage, the first rotatable loop comprising a first curved face;
   a second rotatable loop extending between two second extremities mounted to the two opposite ends of the carriage, the second rotatable loop comprising a second curved face,
   wherein the first rotatable loop and the second rotatable loop connect to each other on first and second sections thereof each adjacent a respective one of the two opposite ends of the carriage so that the first curved face and the second curved face form a first tunnel in the first section and a second tunnel in the second section, each one of the first and second tunnels being coaxial with the channel, and
   wherein the first and second tunnels each have a length that varies as the first and second rotatable loops rotate in response to a translation of the carriage along the elongated guiding structure.

* * * * *